United States Patent [19]
Nishihara et al.

[11] Patent Number: 5,458,212
[45] Date of Patent: Oct. 17, 1995

[54] TRACTION CONTROL DEVICE FOR VEHICLE

[75] Inventors: Takashi Nishihara; Toru Ikeda; Shuji Shiraishi; Osamu Yamamoto, all of Wako; Osamu Yano, Tochigi, all of Japan

[73] Assignee: Honda Giken Kogyo Kabushiki Kaisha, Tokyo, Japan

[21] Appl. No.: 301,901

[22] Filed: Sep. 7, 1994

[30] Foreign Application Priority Data

Sep. 7, 1993 [JP] Japan .................. 5-222604

[51] Int. Cl.$^6$ .............................. B60K 28/16; B60T 8/32
[52] U.S. Cl. ................ 180/197; 364/426.02; 364/426.03
[58] Field of Search ...................... 180/197; 364/426.02, 364/426.03

[56] References Cited

U.S. PATENT DOCUMENTS

| | | | |
|---|---|---|---|
| 5,113,963 | 5/1992 | Sigi et al. | 180/197 |
| 5,119,299 | 6/1992 | Tamura et al. | 180/197 |
| 5,180,027 | 1/1993 | Hagiya | 180/197 |
| 5,365,443 | 11/1994 | Tsuyama et al. | 180/197 |
| 5,365,444 | 11/1994 | Suzuki et al. | 180/197 |
| 5,370,199 | 12/1994 | Akuta et al. | 180/197 |

FOREIGN PATENT DOCUMENTS

| | | |
|---|---|---|
| 3836680 | 5/1990 | Germany . |
| 3-258933 | 11/1991 | Japan . |

*Primary Examiner*—Mitchell J. Hill
*Attorney, Agent, or Firm*—Armstrong, Westerman, Hattori, McLeland & Naughton

[57] ABSTRACT

In a traction control device in which an initial control torque of an engine is determined in accordance with an acceleration of the vehicle, when an excessive slipping of driven wheels is detected, a time taken for proceeding of the excessive slipping of the driven wheels from a large slip state to a small slip state is counted by a timer. If such time is smaller than a reference time and a gear ratio of the vehicle is of a first gear shift to provide a low vehicle speed, it is decided that the vehicle is traveling on an upward sloping road, and a lower limit value for defining the initial control torque of the engine determined in an initial control torque calculating means is corrected into an increased value in an initial torque correcting means. This prevents the initial control torque of the engine from being excessively reduced at the start of a traction control. By this construction, it is possible to prevent an initial control torque from being excessively reduced due to a misjudgment of a friction coefficient of a surface of an upward or downward sloping road to insure an acceleratability of a vehicle.

2 Claims, 3 Drawing Sheets

TRACTION CONTROL DEVICE FOR VEHICLE

BACKGROUND OF THE INVENTION

1. Field of the Invention

The present invention relates to a traction control device for a vehicle, including a slip-state detecting means for detecting an excessive slipping of a driven wheel of the vehicle, and a driven wheel torque control means for calculating an initial control torque of an engine in accordance with the acceleration of the vehicle to provide a torque in accordance with said initial control torque to the driven wheel, when the excessive slipping of the driven wheel is detected by the slip-state detecting means.

2. Description of the Prior Art

Such traction control device for the vehicle is disclosed in Japanese Patent Application Laid-open No.258933/91 proposed by the present applicant.

When the vehicle including the above prior art traction control device is fallen into an excessive slipping state during traveling on an upward sloping road, it is more difficult to accelerate the vehicle, as compared with the traveling on a flat road. Therefore, when the vehicle is traveling on such an upward sloping road, a friction coefficient of a road surface is misjudged to be small, notwithstanding that the actual friction coefficient of the road surface is relatively high. As a result, the initial control torque of the engine in operating the traction control device is suppressed to a value smaller than an appropriate value and hence, a sufficient acceleration may not be obtained.

SUMMARY OF THE INVENTION

The present invention has been accomplished with the above circumstance in view, and it is an object of the present invention to provide a traction control device for a vehicle, wherein an appropriate initial control torque of the engine can be applied upon operation of the traction control device during traveling of the vehicle on a sloping road.

To achieve the above object, according to claim 1 of the present invention, a traction control device for a vehicle, comprising a slip-state detecting means for detecting an excessive slipping of a driven wheel of the vehicle, and a driven wheel torque control means for calculating an initial control torque of an engine in accordance with the acceleration of the vehicle to provide a torque in accordance with the initial control torque to the driven wheel, when the excessive slipping of the driven wheel is detected by the slip-state detecting means, wherein the traction control device further comprises: a slip convergence time counting means for counting the time taken for proceeding from a first slip state to a second slip state which is smaller than the first slip state when the driven wheel is in the excessive slipping; and an initial torque correcting means for correcting the initial control torque in accordance with an output from the slip convergence time counting means.

With the arrangement of claim 1, it is possible to prevent the initial control torque from being excessively reduced due to a misjudgment of the surface friction coefficient of an upward sloping road by correcting the initial control torque in accordance with the time of convergence of the excessive slipping of the driven wheels, and to insure the acceleratability of the vehicle while suppressing the excessive slipping of the driven wheels.

According to claim 2 of the present invention, a traction control device for a vehicle, comprising a slip-state detecting means for detecting an excessive slipping of a driven wheel of the vehicle, and a driven wheel torque control means for calculating an initial control torque of an engine in accordance with the acceleration of the vehicle to provide a torque in accordance with the initial control torque to the driven wheel, when the excessive slipping of the driven wheel is detected by the slip-state detecting means, wherein the traction control device further comprises: an upward or downward sloping road judging means for judging the upward or downward sloping road at the time of starting of the vehicle; and a lower limit torque correcting means for correcting the lower limit value of the initial control torque in accordance with an output from the upward or downward sloping road judging means.

With the arrangement of claim 2, it is possible to prevent the initial control torque from being excessively reduced due to a misjudgment of the surface friction coefficient of an upward or downward sloping road by judging the upward or downward sloping road at the start of the vehicle, and to insure the acceleratability of the vehicle while suppressing the excessive slipping of the driven wheels.

The above and other objects, features and advantages of the invention will be apparent from the following description of preferred embodiments taken in conjunction with the accompanying drawings.

DESCRIPTION OF THE PREFERRED EMBODIMENTS

The present invention will now be described by way of preferred embodiments in connection with the accompanying drawings.

Figure 1:
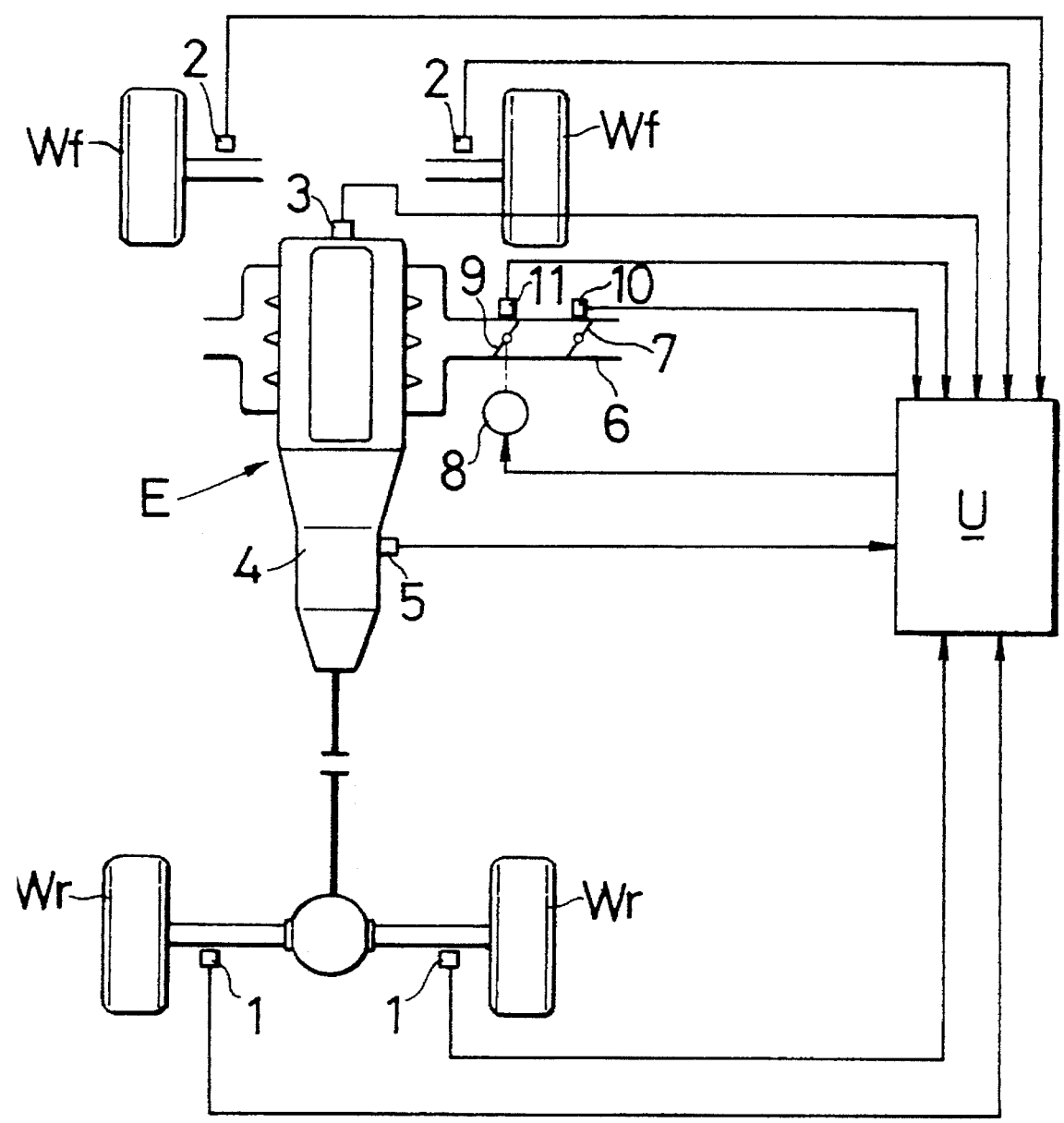
FIG. 1 is a schematic illustration of a vehicle including a traction control device according to a first embodiment.
Figure 2:
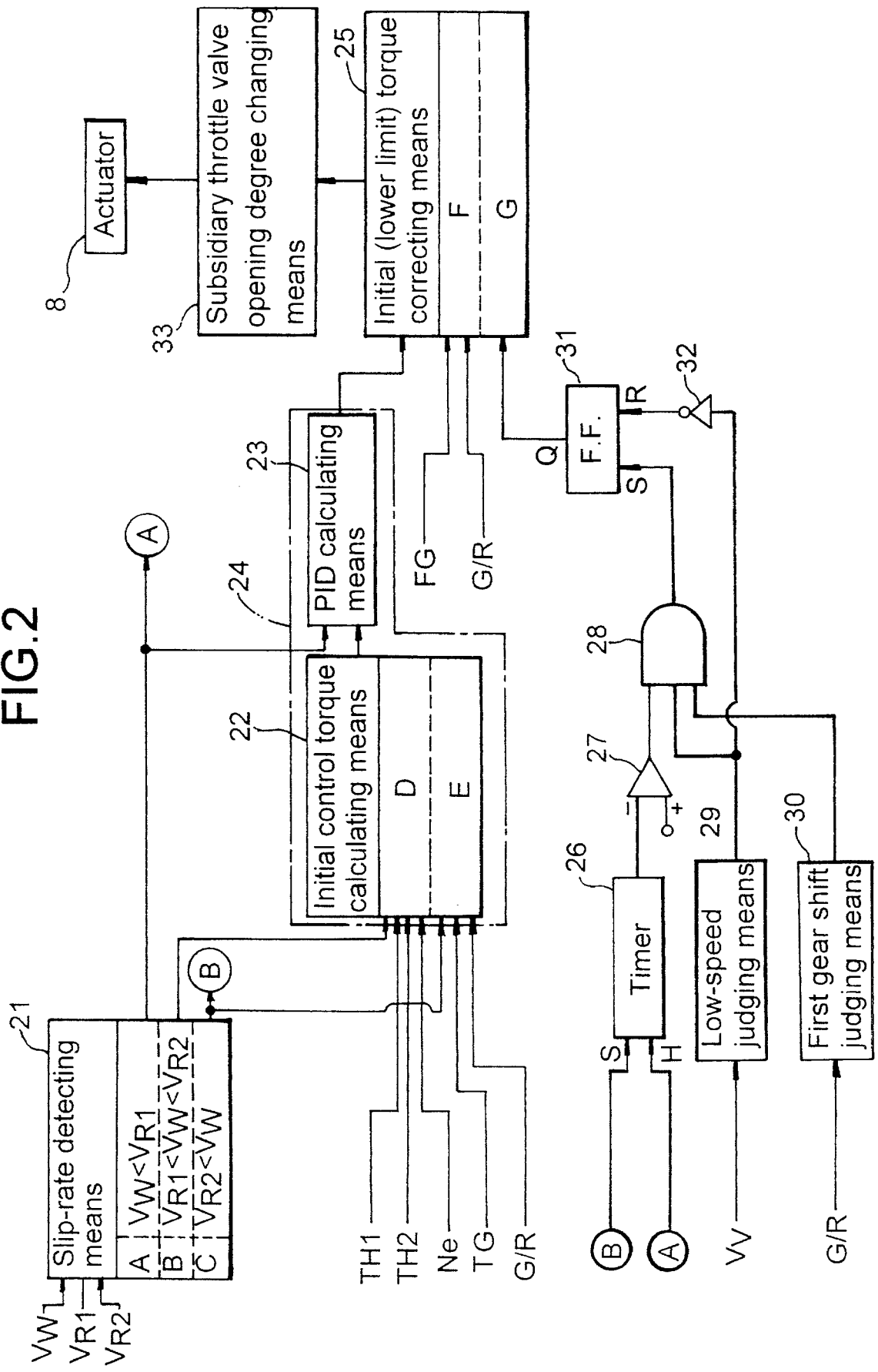
FIG. 2 is a block diagram of the traction control device.

FIGS. 1 and 2 illustrate a first embodiment of the present invention. FIG. 1 is a schematic illustration of a vehicle including a traction control device, and FIG. 2 is a block diagram of the traction control device.

As shown in FIG. 1, a vehicle includes a pair of driven wheels Wr, Wr driven by an engine E, and a pair of follower wheels Wf, Wf. The driven wheels Wr, Wr and the follower wheels Wf, Wf are provided with driven wheel speed sensors 1, 1 for detecting driven wheel speeds Vw, and follower wheel speed sensors 2, 2 for detecting follower wheel speeds Vv, respectively. The engine E is provided with an engine revolution-number sensor 3 including a gear and an electromagnetic pickup for detecting a number Ne of revolutions of the engine, and a gear ratio sensor 5 for detecting a gear ratio G/R of a transmission 4. Provided in an intake passage 6 in the engine are a main throttle valve 7 mechanically connected through a link mechanism to an accelerator pedal (not shown) and opened and closed by the accelerator pedal, and a subsidiary throttle valve 9 connected to an actuator 8 such as a pulse motor and opened and closed by the actuator 8. A main throttle valve opening-degree sensor 10 is provided on the main throttle valve 7 for detecting the opening degree thereof, and a subsidiary throttle valve opening-degree sensor I1 is provided on the subsidiary throttle valve 9 for detecting the opening degree thereof.

Signals from the driven wheel speed sensors 1, 1, the follower wheel speed sensors 2, 2, the engine revolution-number sensor 3, the gear ratio sensor 5, the main throttle valve opening-degree sensor 10 and the subsidiary throttle valve opening-degree sensor I1 are supplied to an electronic control unit U comprised of a microcomputer, where these signals are mathematically processed. On the basis of results of the mathematical processing, the opening degree of the subsidiary throttle valve 9 is controlled through the actuator 8, thereby reducing the output from the engine E to suppress an excessive slipping of the driven wheels Wr, Wr.

FIG. 2 illustrates a circuit arrangement in the electronic control unit U. A slip-state detecting means 21 is for detecting an excessive slipping of the driven wheels W, Wr. A first reference speed $V_{R1}$ and a second reference speed $V_{R2}$ are inputted to the slip state detecting means. The first reference speed $V_{R1}$ is provided by multiplying the vehicle speed Vv by a predetermined rate, and the second reference speed $V_{R2}$ is previously set to be larger than the first reference speed $V_{R1}$ ($V_{R2} > V_{R1}$).

In the slip-state detecting means 21, the driven wheel speed Vw and the first and second reference speeds $V_{R1}$ and $V_{R2}$ are compared. If the driven wheel speed Vw is smaller than the first reference speed $V_{R1}$, i.e., if the slip rate of the driven wheels Wr, Wr is small (a second slip-state in the present invention), an output from a circuit A is brought into a high level. If the driven wheel speed Vw is between the first and second reference speeds $V_{R1}$ and $V_{R2}$, i.e., if the slip rate of the driven wheels Wr, Wr is of a medium level, an output from a circuit B is brought into a high level. Further, if the driven wheel speed Vw is larger than the second reference speed $V_{R2}$, i.e., if the slip rate of the driven wheels Wr, Wr is large (a first slip-state in the present invention), an output from a circuit C is brought into a high level.

An initial control torque calculating means 22 calculates an initial control torque of the engine E required for determining an initial opening degree when feedback-controlling the opening degree of the subsidiary throttle valve to suppress the excessive slipping of the driven wheels Wr, Wr. The initial control torque calculating means 22 includes a circuit D which is operated when the slip rate of the driven wheels Wr, Wr is of the medium level and the output from the circuit B is brought into the high level, and a circuit E which is operated when the slip rate is large (the first slip-state) and the output from the circuit C is brought into the high level.

A main throttle valve opening degree TH1, a subsidiary throttle valve opening degree TH2 and an engine revolution number Ne are supplied to the circuit D from the main throttle valve opening degree sensor 10, the subsidiary throttle valve opening degree sensor 11 and the engine revolution-number sensor 3, respectively. In the circuit D, an initial control torque is determined in a following manner: Smaller one of the main throttle valve opening degree TH1 and the subsidiary throttle valve opening degree TH2 is selected and corrected on the basis of the atmospheric pressure to provide a correction value. Then, a map-search is carried out on the basis of the correction value and the engine revolution-number Ne to provide a map-searched value, and a constant is subtracted from a primary moderated value of the map-searched value. A resulting value is defined as an initial control torque.

A gear ratio G/R detected by the gear ratio sensor 5 and a total acceleration TG of the vehicle are supplied to the circuit E. The total acceleration TG is determined as a vector sum of a longitudinal acceleration FG of the vehicle and a lateral acceleration LG of the vehicle. The longitudinal acceleration FG is determined from a time differential value of the driven wheel speed Vw, and the lateral acceleration LG is determined by multiplying a yaw rate of the vehicle determined from a difference between outputs from the left and right follower wheel speed sensors 2, 2, by the vehicle speed Vv. An initial control torque is map-searched from the gear ratio G/R and the total acceleration TG.

In a PID calculating means 23, a target torque ACCT of the engine E for feedback control of the opening degree of the subsidiary throttle valve 9 to suppress the excessive slipping of the driven wheels Wr, Wr is determined. The target torque ACCT is represented by a following expression:

$$ACCT = I - P - D$$

The I, P and D terms in this expression are represented by
$1(k) = I(k-1) - KI \times Vv$
$P(k) = KP \times Vv$
$D(k) = KD \times DVv$
wherein each of KI, KP and KD is a preset factor, and DVv is a differential value of the vehicle speed Vv.

The initial control torque determined in the initial control torque calculating means 22 is used as an initial value for the I term of the target torque ACCT when the traction control device is operated. This initial control torque corresponds to an effective torque resulting from subtraction of an excess torque consumed for the excessive slipping of the driven wheels Wr, Wr from a total torque transmitted to the driven wheels Wr, Wr, i.e., a torque effectively utilized for increasing the speed of the vehicle without causing an excessive slipping of the driven wheels Wr, Wr. After operation of the traction control device, the excessive slipping of the driven wheels Wr, Wr is promptly converged.

The initial control torque calculating means 22 and the PID calculating means 23 constitute a driven wheel torque control means 24 of the present invention.

When the target torque ACCT of the engine E is determined in the above manner, a lower limit value for the initial control torque determined in the initial control torque calculating means 22 is defined in an initial (lower limit) torque correcting means 25. More specifically, the longitudinal acceleration FG of the vehicle and the gear ratio G/R are supplied to a circuit F of the initial (lower limit) torque correcting means 25. And a lower limit value of initial control torque is map-searched from the longitudinal acceleration FG and the gear ratio G/R. If the lower limit value of initial control torque determined in the initial control torque calculating means 22 is lower than the map-searched value, this map-searched value is employed as a new lower limit value.

The lower limit value of initial control torque is corrected even by a circuit G of the initial (lower limit) torque correcting means 25. More specifically, a signal from the circuit C of the slip-state detecting means 21 is supplied to a set terminal of a timer 26 serving as a slip converging time counting means, and a signal from the circuit A of the slip-state detecting means 21 is supplied to a holding terminal of the timer 26. Therefore, a time taken for proceeding from a state of a large slip rate (the first slip-state) of the driven wheels Wr, Wr to a state of a small slip rate (the second slip-state) is outputted from the timer 26. The timer 26 is connected to an inverted terminal of a comparator circuit 27, and a preset reference time is inputted to a non-inverted terminal of the comparator circuit 27. This reference time corresponds to a time required for convergence of the excessive slipping, when the vehicle is traveling on a usual flat road surface. If the time outputted from the timer 26 is smaller than the reference time and the excessive slipping of the driven wheels Wr, Wr is converged faster than usual, an output from the comparator circuit 27 is brought into a high level.

In addition to the comparator circuit 27, a low-speed judging means 29 and a first gear shift judging means 30 are connected to an AND circuit 28. The low-speed judging means 29 outputs a high level signal during low speed traveling of the vehicle at a vehicle speed Vv lower than the reference value. The first gear shift judging means 30 outputs a high level signal when the gear ratio G/R is of the first gear shift. Therefore, if the gear ratio G/R is of the first gear shift and the vehicle speed is low, and if the excessive slipping of the driven wheels is converged faster than usual, an output from the AND circuit 28 is brought into a high level. The AND circuit 28 is connected to a set terminal of a flip-flop circuit 31. And the low-speed judging means 29 is connected through a NOT circuit 32 to a reset terminal of the flip-flop circuit 31. Thus, if the output from the AND circuit 28 is brought into a high level, an output from the flip-flop circuit 31 is brought into a high level. If the vehicle speed exceeds a predetermined value, the output from the flip-flop circuit 31 is reset at a low level.

When the vehicle is fallen into a largely excessive slipping state on an upward sloping road immediately after starting, it is more difficult to accelerate the vehicle, as compared with the traveling on a flat road. Therefore, the total acceleration TG applied to the circuit E of the initial control torque calculating means 22 is decreased. As a result, the surface friction coefficient of the upward sloping road is misjudged to be smaller value than an actual value, and the initial control torque map-searched becomes lower than necessary in the circuit E. However, the actual surface friction coefficient on the upward sloping road is larger than the surface friction coefficient misjudged on the basis of the total acceleration TG. Therefore, the excessive slipping of the driven wheels Wr, Wr is converged faster than usual, and the outputs from the comparator circuit 27, the AND circuit 28 and the flip-flop circuit 31 are brought into high levels, respectively.

In the above-described prior art traction control device, if the driven wheels Wr, Wr of the vehicle started on the upward sloping road is fallen into the excessive slipping in the above manner, the friction coefficient of the road surface is misjudged to be small because of a small acceleration of the vehicle, and the initial control torque is suppressed to a low value. However, according to the first embodiment of the present invention, such misjudging can be compensated for by monitoring the time of convergence of the excessive slipping. More specifically, when the output from the flip-flop circuit 31 is brought into the high level, a value resulting from increasing of the lower limit value of initial control torque, for example, by a given value, is employed as a new lower limit value. If the speed of the vehicle is increased and the output from the low-speed judging means 29 is brought into the high level, a high level signal is supplied to the reset terminal of the flip-flop circuit 31 and thus, the output from the flip-flop circuit 31 is brought into a low level, thereby causing the correction of the lower limit value of initial control torque by the circuit G to be discontinued.

A subsidiary throttle valve opening degree TH2 corresponding to the target torque ACCT of the engine E calculated in the PID calculating means 23 is calculated in a subsidiary throttle valve opening degree changing means 33. The output torque from the engine E is reduced to suppress the excessive slipping of the driven wheels by feedback control of the subsidiary throttle valve 9 through the actuator 8 such that the subsidiary throttle valve opening degree TH2 can be obtained. If the slip rate is less than the second slip state and the output from the circuit A of the slip-state detecting means 21 is brought into the high level, the calculation of the target torque ACCT in the PID calculating means 23 is discontinued to finish the traction control. During that time, it is possible to prevent the initial opening degree of the subsidiary throttle valve 9 at the start of the control from being decreased more than necessary due to the misjudgment of the friction coefficient of the surface on the upward sloping road, and to insure the acceleratability of the vehicle at the start on the upward sloping road.

Figure 3:
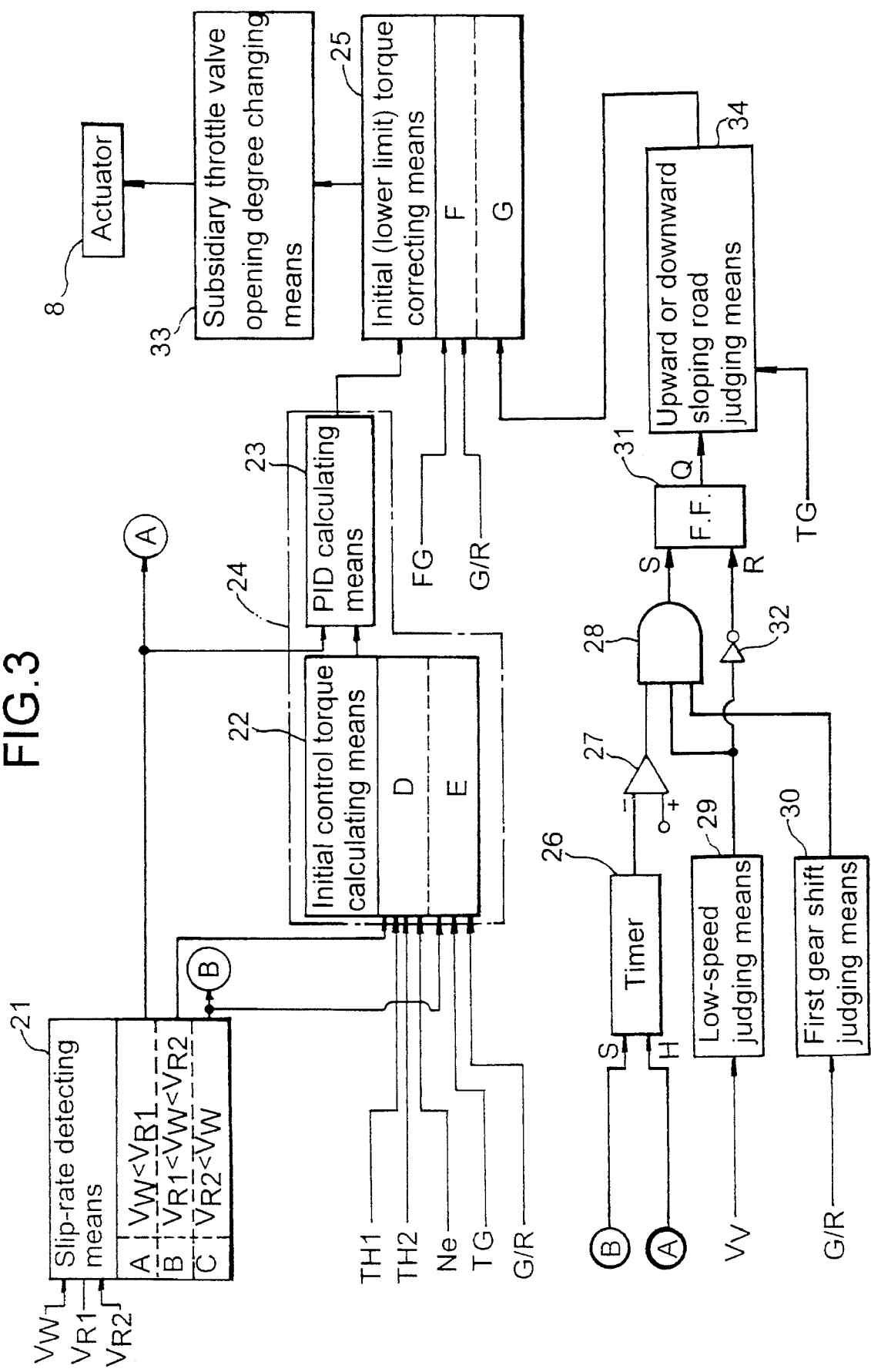
FIG. 3 is a block diagram similar to FIG. 2, but illustrating a traction control device according to the second embodiment.

A second embodiment of the present invention will now be described in connection with FIG. 3.

The second embodiment includes an upward/downward sloping road judging means 34 to which a signal from the flip-flop circuit 31 and a total acceleration TG are supplied. If it is detected that the output from the flip-flop circuit 31 is brought into a high level and the friction coefficient of the road surface is misjudged, it is judged on the basis of the current total acceleration TG whether the vehicle is on an upward sloping road of a steep gradient, on an upward sloping road of a gentle gradient, or on a flat road or on a downward sloping road. More specifically, if the total acceleration TG is extremely smaller than usual, it is decided that the vehicle is on an upward sloping road of a steep gradient, and the lower limit value of initial control torque is largely increased in the circuit G of the initial (lower limit) torque correcting means 25. If the total acceleration TG is slightly smaller than usual, it is decided that the vehicle is on an upward sloping road of a gentle gradient, and the lower limit value of initial control torque is slightly increased. If the total acceleration TG is equal to or larger than a usual value, it is decided that the vehicle is on a flat road or a downward sloping road, and the correction of the lower limit value of initial control torque is discontinued.

According to the second embodiment, it is possible to more accurately control the lower limit value of initial control torque by properly judging the inclination of the road surface, and to further effectively insure the acceleratability of the vehicle at the start on the upward sloping road.

Although the embodiments of the present invention has been described in detail, it will be understood that the present invention is not limited to these embodiments, and various modifications in design can be made without departing from the spirit and scope of the invention defined in claims.

For example, the time taken for proceeding from the first slip state to the second slip state may be measured at a plurality of stages, and in each case, the correction quantity for the lower limit value of initial control torque may be varied. In place of determination of the reference time for judging the time taken for proceeding from the first slip state to the second slip state as a fixed value, the reference time can be a variable value depending upon the output torque from the engine when the excessive slipping is detected. Further, in place of correction of the lower limit value of initial control torque, the initial control torque itself can be corrected.

What is claimed is:

1. A traction control device for a vehicle, comprising a slip-state detecting means for detecting an excessive slipping of a driven wheel of the vehicle, and a driven wheel torque control means for calculating an initial control torque of an engine in accordance with the acceleration of the vehicle to provide a torque in accordance with said initial control torque to the driven wheel, when the excessive slipping of the driven wheel is detected by the slip-state detecting means, wherein said traction control device further comprises:

- a slip convergence time counting means for counting the time taken for proceeding from a first slip state to a second slip state which is smaller than said first slip state, when the driven wheel is in said excessive slipping; and
- an initial torque correcting means for correcting said initial control torque in accordance with an output from the slip convergence time counting means.

2. A traction control device for a vehicle, comprising a slip-state detecting means for detecting an excessive slipping of a driven wheel of the vehicle, and a driven wheel torque control means for calculating an initial control torque of an engine in accordance with the acceleration of the vehicle to provide a torque in accordance with said initial control torque to the driven wheel, when the excessive slipping of the driven wheel is detected by the slip-state detecting means, wherein said traction control device further comprises:

- an upward or downward sloping road judging means for judging the upward or downward sloping road at the time of starting of the vehicle; and
- a lower limit torque correcting means for correcting the lower limit value of said initial control torque in accordance with an output from the upward or downward sloping road judging means.

* * * * *